No. 757,766. PATENTED APR. 19, 1904.
R. P. PALMER.
FOLDING TRIPOD.
APPLICATION FILED AUG. 10, 1898.
NO MODEL. 2 SHEETS—SHEET 1.
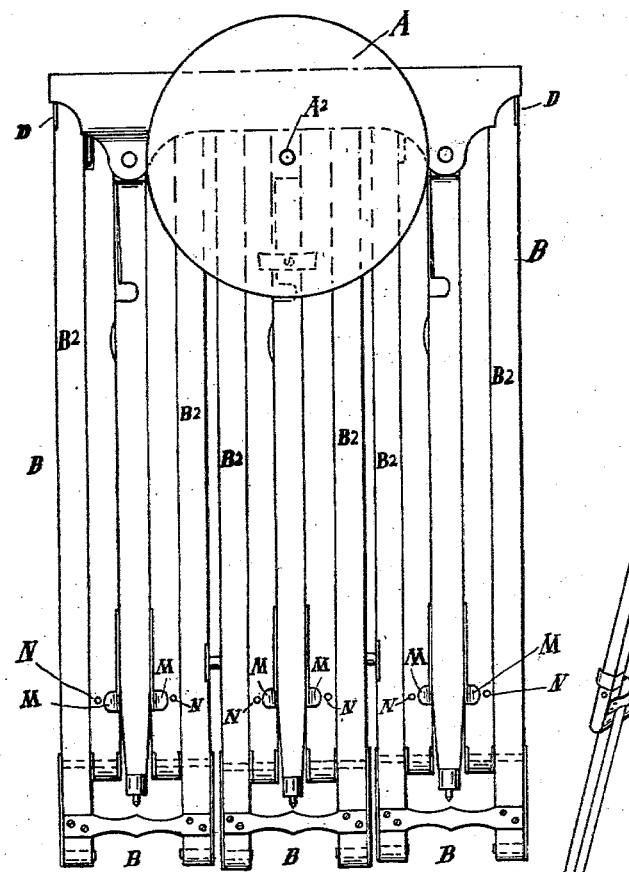
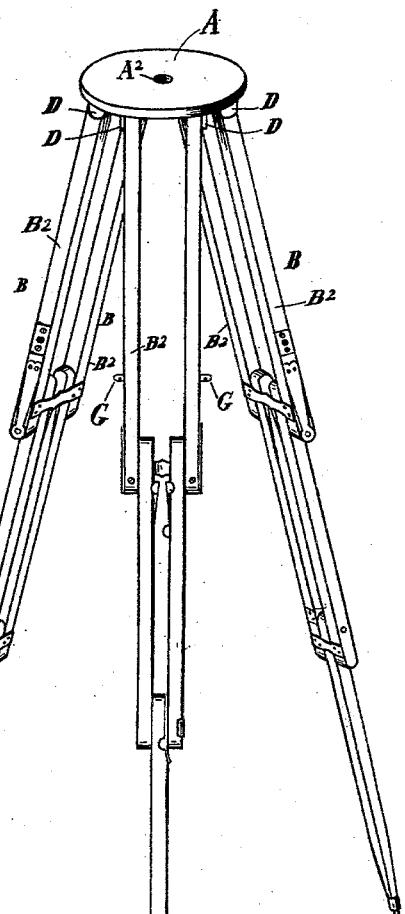
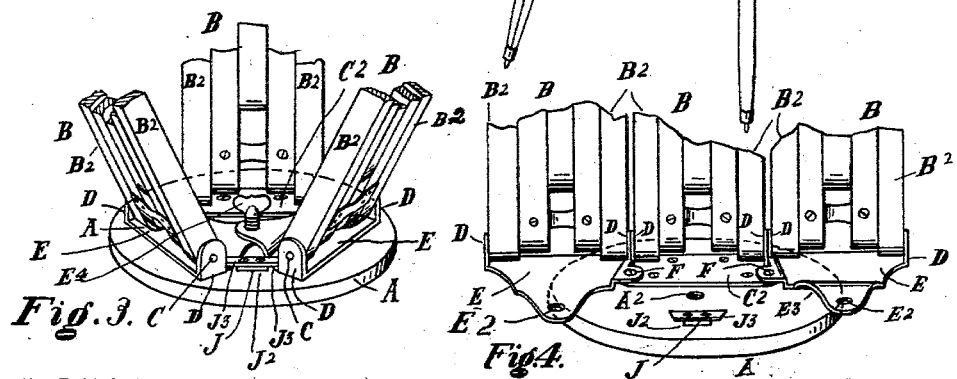
WITNESSES:
Charles H. Spiegel
K. Smith
INVENTOR.
Richard P. Palmer
BY Wm. Hubbell Fisher
ATTORNEY.

No. 757,766. PATENTED APR. 19, 1904.
R. P. PALMER.
FOLDING TRIPOD.
APPLICATION FILED AUG. 10, 1898.
NO MODEL. 2 SHEETS—SHEET 2.
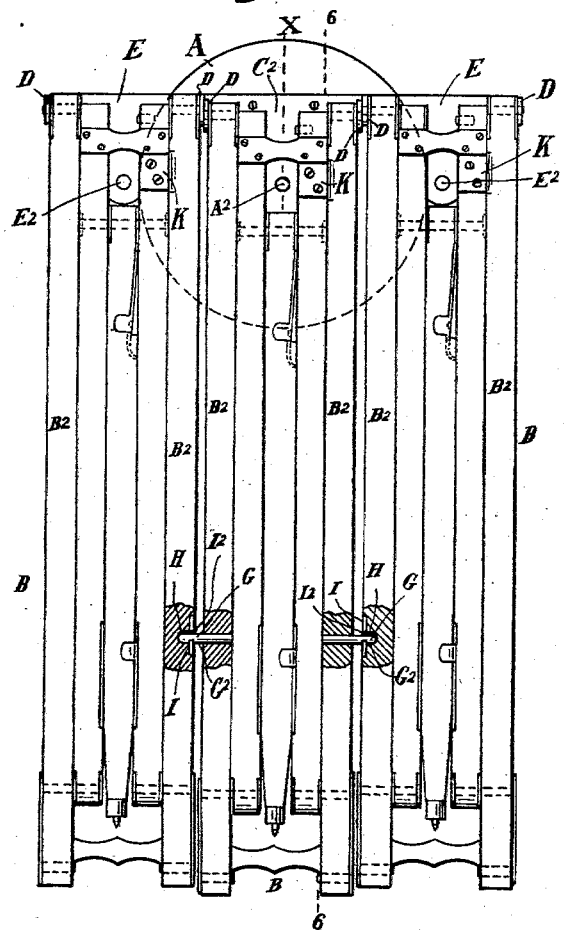
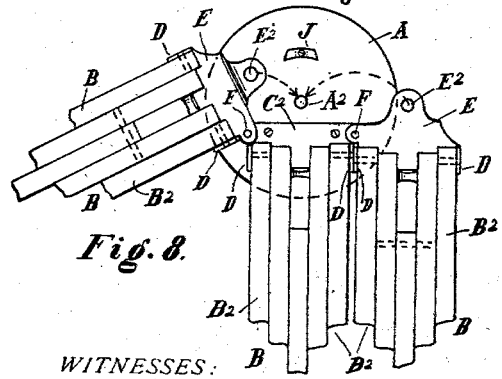
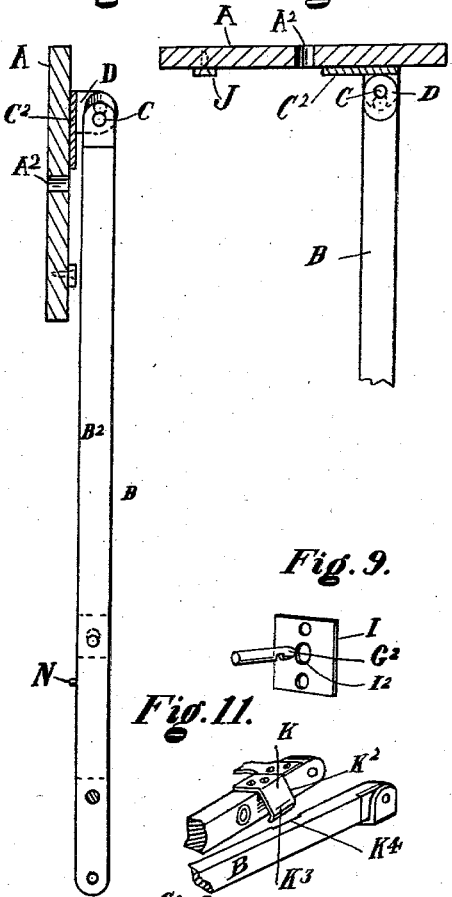
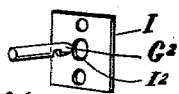
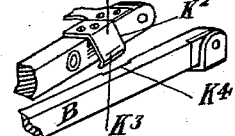
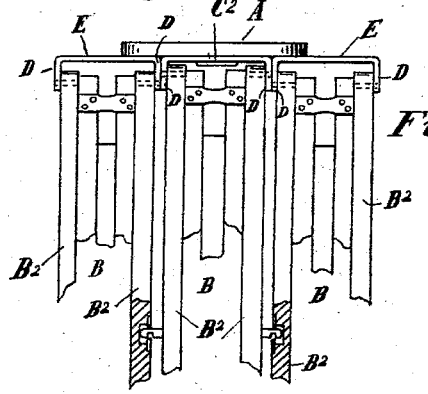
WITNESSES:
Charles H. Spiegel
R. Smith
INVENTOR.
Richard P. Palmer
BY Wm. Hubbell Fisher
ATTORNEY.

No. 757,766.

Patented April 19, 1904.

UNITED STATES PATENT OFFICE.

RICHARD P. PALMER, OF BONDHILL, OHIO, ASSIGNOR TO WILLIAM HUBBELL FISHER, OF CINCINNATI, OHIO.

FOLDING TRIPOD.

SPECIFICATION forming part of Letters Patent No. 757,766, dated April 19, 1904.

Application filed August 10, 1898. Serial No. 688,243. (No model.)

*To all whom it may concern:*

Be it known that I, RICHARD P. PALMER, a citizen of the United States, and a resident of the town of Bondhill, in the county of Hamilton and State of Ohio, have invented certain new and useful Improvements in Folding Tripods, of which the following is a specification.

My invention contemplates a construction wherein the legs when not needed in use can, while attached to the top or plate, be folded out or laid flat in the same horizontal plane.

My invention contemplates also a construction wherein when the legs are laid out flat in the same plane the top or plate can be folded down flat against the legs.

My invention contemplates also a construction whereby when the legs lie in the same plane and the top of the tripod is folded down the movement of the top in being folded down operates automatically to lock the legs together.

My invention is applicable to certain cases where each leg is made in sections, these sections being made to fold together, thereby materially diminishing the length of the tripod when folded, and in connection with certain kinds of such construction my invention contemplates provision for certain protective and frictional devices.

My invention further contemplates means whereby when the legs are assembled in working position beneath the tripod-plate the central device connecting the tripod with the camera will also serve to lock them together immovably.

The several features of my invention and the various advantages resulting from their use conjointly or otherwise will be apparent from the following description and claims.

In the accompanying drawings, making a part of this specification, and in which similar letters of reference indicate corresponding parts, Figure 1 is a perspective view of a tripod embodying my invention. Fig. 2 represents in elevation this tripod when the several portions of each leg are folded and the folded legs are brought edge to edge, the legs thus lying in a common plane. The head is shown folded against the legs. Fig. 3 represents in perspective the head of the tripod, a part of each leg, and of the means which connect the legs to the head, also showing the tripod-screw for connecting the tripod-head to the camera or the like, which in practice is located thereon. In this figure the parts are in the same position as in Fig. 2, but are shown in an inverted position. Fig. 4 represents in perspective a view of the tripod-head and the adjacent portions of the legs when the latter are in a common plane and the tripod-head occupying a plane at right angles to the common plane occupied by the legs. Fig. 5 is a side elevation of the tripod when the several parts occupy the position shown in Fig. 2, but showing the opposite side of the tripod and the legs. Fig. 6 represents a view of certain portions of the tripod when the parts are in the position shown in Figs. 2 and 5; but all of the legs and parts of legs of the tripod to the left of the dotted line 6 6 of Fig. 5 are omitted. The tripod-head is shown in vertical central section, the section being taken in the direction of the plane of the dotted line $x$ of Fig. 6. This view indicates a position of the pivots of the middle leg relative to the pivots of the other legs. Fig. 7 is a view of the same parts shown in Fig. 6 and from the same point of view; but in this view, Fig. 7, the tripod-head is at right angles to the leg. The lower portion of this leg is omitted to obtain room for other illustrations. This view indicates the change of position of the pivots of the middle leg relative to the pivots of the other leg. Fig. 8 is an elevation of the tripod-head and of the upper portion of the legs when the latter are being rotated. Fig. 9 shows in perspective the preferred form of catch-stud and of the catch-plate for engaging the groove of such catch-stud for enabling the legs to be locked together by the tripod-head when moved as required. Fig. 10 illustrates a position of the tripod when the folded legs are in a common plane and the tripod-head at right angles to this plane. A portion only of the legs is shown. Fig. 11 is a perspective view of the upper ends of parts of a folding sectional leg and showing a device for causing the sections of the leg, of which these ends are parts, to be frictionally held in place when the tripod is folded.

In order to abbreviate subsequent explanation of the figures and reference thereto, it is to be noted that in Fig. 5 and in Fig. 10 a portion of the legs adjacent to each other is broken away to uncover the means there located for locking these legs there together. In Fig. 5 these means are shown in the position they assume when they have locked the legs together. In Fig. 8 these means are shown in the position they assume when they have unlocked the legs. In Figs. 4 and 10 the tripod-head and the legs are in the same relative positions; but in Fig. 10 the view is of the opposite side of the tripod-head and the legs from that shown in Fig. 4. In Fig. 4 the tripod-head and legs are shown upside down, and the under side of the tripod-head and its accompaniments are seen. In Fig. 10 the head and legs are in right-end-up position.

I will now proceed to describe my invention in detail. A is the tripod-plate, and B B B represent legs for the same. The tripod-plate A is a board or plate and in its own general outline and conformation does not differ, essentially, from those plates or boards in common use. One leg is connected to the tripod-plate by suitable hinges, and these hinges may be of any approved kind. The legs are not in the illustrations shown detachable; but they may be made detachable in any proper manner. If detachable, the preferred mode of making them detachable is one which when the tripod is set up compels the leg to be lifted, so that its length is substantially at right angles to the vertical before it can be detached; but such capacity for detachment forms no part of my present invention. The legs are preferably, as usual, wide at the top to insure strength and rigidity of structure and are of the skeleton form, two sticks or ribs forming the upper portion of the leg. When the tripod-plate A is of metal, one part of the hinges is preferably integral therewith. In the present illustrative drawings I have shown a simple mode of attaching these skeleton legs to the tripod—viz., by means of a pivot-rod C, passing transversely through the upper end of the rib $B^2$ of the leg. This pivot-rod is duly connected to a lug D, which is in turn connected to the tripod-head, (preferably by means of screws.) The lugs D and pivot-rods C of one leg (the central leg when the legs are folded flat against each other, as shown in the drawings,) are held in fixed relation to the tripod-plate A, and the other two outer legs of the tripod are so connected to the plate A as to be capable of not only being moved pivotally upon their pivot-rods C, but also of being so moved as to bring their pivot-rods parallel with or at angles to the pivot-rod of the central leg, so as to permit the three legs to be folded flat against each other when the pivot-rods are parallel or to be unfolded and set in position for supporting the plate A for use when the pivot-rods C are at angles to each other. For securing the outer legs to the plate A, I employ the means which I will now describe. The pivot C for thus connecting rib $B^2$ of the leg to a lug is shown by solid lines in Figs. 3 and 6 and in other figures, as 7 and 8, by dotted lines.

On the bottom of the tripod-head I locate two plates E E, and I make each of these to swing, and for the latter purpose I provide a pivot F, secured to the tripod-head either directly or by the intervention of a supplemental piece, the latter then being attached to the tripod-head. Thus each of these plates is free to swing on its pivot. To each of these plates a leg of the tripod is suitably secured. I have shown for illustration the same kind of means of attachment for these to their respective plates as I have shown for securing the first-named leg to the tripod-head. Thus I have all of the legs secured to the tripod-head.

In order to attain a compact arrangement of the tripod, it is necessary that each leg should be in sections capable of being folded together. Any mode of constructing them to fold may be used provided that such mode does not interfere with their combination with my present invention. In the drawings I have shown one mode of folding these sections together and of duly fixing them in position when unfolded. The legs may be folded before or after the several legs are moved into the same plane, substantially as shown in Fig. 3 and also as shown in Figs. 1, 4, 5, and 8, with this exception that in Figs. 4 and 5 the tripod-head is shown laid down flat on the sections. After the leg-sections have been folded and all of the sections lie in a common plane the head or top is folded flat down upon them, as shown in Figs. 1 and 4. I have provided a mechanism by means of which the folding down of the head serves to effectually lock together the three adjacent legs lying in the same plane. The mechanism is as follows: Studs G project from the outer edges of the middle leg substantially as shown in Figs. 5 and 8, and recesses H (see the same figures) are present in those portions of the edges of the outer legs which respectively come opposite to the studs G, so when the legs are located together (edge to edge) in the same plane one of these studs G enters the adjacent recess in one leg and the other stud enters the adjacent recess H in the other leg. Each recess has a catch-lug I, and each stud has a recess $G^2$, capable of receiving the adjacent catch-lug. When the plate A is at right angles to the legs, as indicated in Figs. 4 and 8, the studs are out of engagement with the catch-lugs of the recesses H; but when the plate A is folded down flat against the legs, as shown in Figs. 1 and 5, the catch-lug I will enter the recess $G^2$ of the stud and the legs will be locked together. This is accomplished by the following construction: The pivots C of the middle leg are located on the tripod plate or head A in a different plane from the pivots of the other legs. The planes I refer to are at right angles to the plane of the head A. This construction is clearly shown in the Figs. 5 and 6. Thus when (see these figures) the plate A is folded down flat against the legs the pivots C of the middle leg are farther down than the pivots C of the side legs, and thus as the plate A is moved from its position (see Figs. 4 and 8) at right angles to the legs B to its position flat (see Figs. 1, 5, and 6) against the legs the middle leg is forced lengthwise along in one direction, while the other legs are moved lengthwise in the other direction. Thus each catch-stud G on the middle leg is compelled to engage with its adjacent catch-lug I on the side legs, the latter entering the groove $G^2$ of the stud G. As soon as this engagement is made the legs are secured together, and will thus be there kept in the same plane. They can unlock from each other by returning the plate A to a position at right angles to the plane of the legs, as in Figs. 4 and 8. This latter movement of the plate A moves the leg so that the middle one is moved longitudinally in an opposite direction from that in which the other legs are moved and the catch-lug I is disengaged from the groove in stud G. Then the legs are free to be rotated to place and to occupy the position customary in a three-legged tripod.

The catch-lug I may be variously formed and attached. A simple mode of making the same is to make an elongated hole in a plate $I^2$ and screw or otherwise duly secure the plate to the leg, a recess H being provided in the leg in line with the hole, so as to freely admit the head of the lug G when the latter is passed through the hole in the plate $I^2$ in preparation for engagement with the catch-lug I.

The plates E, each being pivoted at F, are free (when the legs are unlocked at G) to rotate around toward each other, each plate carrying its leg with it. When these plates thus moved have arrived in the proper position to constitute the tripod, their further movement is checked by a suitable stop. It has a central stud $J^2$ extending down vertically (when the tripod is erected) from the head and has horizontal extensions $J^3$. When the plates E and E are rotatably moved around toward each other, their respective edges will strike the stud $J^2$, and their further rotation will cease. They will then be in a position where the opening $E^2$ of each of them will be in vertical alinement with passage $A^2$ through the head A of the tripod. The neighboring edges of the plates E E will respectively be above the extensions $J^3$ and between them and the head A. Their position here is such that the tripod will stand exceedingly firm, and a downward pressure even when combined with an effort to twist the tripod will not displace them. The camera is now placed upon the tripod, and the securing-screw $E^4$, whereby the camera is to be secured to the tripod, is inserted from beneath and passed up through the passages $E^2$ $E^2$ of the plates, as shown in Fig. 4, and the passage $A^2$ of the head A and is then screwed up into the bottom portion of the camera until the tripod-head and the plates E are securely clamped between the head of the screw and the camera. The entire structure thus assembled is strong and rigid, both of which conditions are greatly to be desired in tripods and in their connection with the cameras which they support. In order to bring into alinement the openings $E^2$ of the two plates and the opening $A^2$, one of the plates is bent in the region of the opening $E^2$, so that this portion of the plate will be in a plane parallel to the rest of the plate. By this means the two plates can be swung around, so that their openings $E^2$ may coincide without the plates interfering with one another. By means of this construction the entire surface of one of the plates and all of that surface of the other plate which has not been bent into a parallel plane will at all times lie snugly up against the under side of the head, thus securing a rigid junction between the head and the plate. When it is desired to knock down—that is, to put the tripod in shape to be carried—the securing-screw aforementioned is withdrawn and the plates E moved apart until the legs are in a common plane. The legs are now shortened or compacted, and care having been taken that the studs G have entered their respective adjacent recesses H in the adjacent legs the head A is now folded upon the legs, and the legs are locked down together, and the whole presents a thin flat structure very easy to carry at one side or at the side of a portmanteau or of a flat camera-box (case) and convenient to lay flat within a traveling-satchel, &c.

When desired, the legs can be compacted before the plates E E are moved away from each other into a common plane, and when for any reason it should be desired to allow the plates to remain closed toward each other in the position they occupy when the tripod is erected they can be so left, and the legs being compacted the tripod will present a quite compact article of a form different from that shape which it is primarily designed to occupy.

When the mode of compacting the legs is as shown in the drawings, and described in my Letters Patent No. 540,611 aforesaid, I provide friction devices K for preventing the lower lengths or divisions of leg when folded into the last or upper section or division from slipping or falling out from between the parallel (or substantially parallel) pieces of the last division. The preferred friction device for this purpose consists of the spring $K^2$, secured to one portion of the leg and bent out at $K^3$ into a bowed or knee form, its free end $K^4$ being bent back, so that its inclined side will always strike the adjacent piece and be guided away from this piece, thus allowing the portion $K^3$ to reach and bear against the said adjacent piece and by its friction hold together with the several compacted divisions the two pieces in alinement unless extraneous force is applied to separate them. Such force is applied through the operator when the leg is to be unfolded. The adjacent leg-piece may be chamfered away at $K^4$ (see Fig. 11) to aid in the easy admission and introduction of the spring between these adjacent leg-pieces. When the guide-lips M need to be protected, which may sometimes be the case, because on that side of the legs (when laid flat) which is shown in Fig. 1 they are the first to receive a pressure at that end portion which is at the left hand in this figure, they can readily be protected by an exceedingly simple means—namely, the studs N, located near the lips, (when the leg is folded,) either in the same piece as the lip or in a neighboring piece. In the latter instance a very convenient location is the lower part of the lowest piece or division of the leg, as shown in the drawings.

In moving the plates E E outwardly, so that their legs shall be in a common plane with the third—i. e., middle—leg suitable stops should be present to limit their movement. I have so constructed the device that the lugs D D of the said third or middle leg shall operate as stops. The adjacent lugs D D of the swinging plates respectively impinge against these lugs D D of the middle leg.

For convenience of manufacture both of the lugs D for respectively holding by a pivot C its rib of the middle leg to the tripod-head are preferably connected to a plate $C^2$, which latter is screwed to the tripod-head substantially as shown, and the plates E E, where pivoted to the tripod-head F are pivoted to this plate $C^2$ and not into the tripod-head above, this plate $C^2$ serving as the tripod-head in holding the pivoted connections to the plates E E. This construction is not only novel and efficacious for the purposes just mentioned, but also for holding the lugs D in such a position that the lugs D of adjacent legs operate as stops when the side legs are rotated out and moved, so as to occupy the same plane as that occupied by the middle leg.

Relative to the position of the studs G G and the catch I $I^2$ and the legs it is to be noted that it is optional whether the studs G G are either or both on the middle leg or on a side leg or legs so long as the opposing adjacent leg carries the complementary catch-lug I $I^2$ and holds it in a position to engage the stud G and its groove, so as to prevent the legs from separating while the tripod-head is folded against the legs, as in Figs. 1 and 5.

What I claim as new and of my invention, and desire to secure by Letters Patent, is—

1. In a tripod, the combination of a head, three plates, having end portions pivotally connected to each other, end to end, the outer plates being adapted for rotary movement toward and from each other and the central plate being held in fixed relation to the head, and the pivoted outer plates being adapted for rotary movement across the under side of the head, and under a holding device and legs pivoted on the respective plates, substantially as and for the purposes specified.

2. In a tripod, the combination of a head having a perforation, legs, two of which have plates pivotally connected to the head and arranged to swing across the same, each of said plates having a perforation adapted, when the plate is moved, to correspond with the perforation in the head, and a screw or the like passed through the perforation in the head and adapted for engagement with the perforation in said plates, substantially as and for the purposes specified.

3. In a tripod, the combination of a head, plates connected to the head and adapted for movement thereon, and each formed with a perforation, the perforations in the plates being adapted to register with each other, a screw or the like adapted to be passed through said perforations, when in register, to hold the plates against relative movement, and legs, two of which are carried by said plates, substantially as set forth.

4. In a tripod, the combination of a head, having an opening to receive the tripod-screw, tripod-screw, legs, two of the legs each having a plate pivoted to the tripod-head, each plate having a hole located for alinement with the hole of the other plate, and with the tripod-screw opening of the head, when the legs are assembled for supporting the tripod-head, and a stop having a securing-stop with which the pivoted plates engage when the latter are approximated, substantially as and for the purposes specified.

5. In a tripod, the combination of the head, and a leg having a pivot-point held in fixed relation on the head, the plates E, each having a pivotally-connected leg, the pivots of the legs of the plates being out of alinement with the pivot holding the central leg, and catches respectively present between adjacent legs, for locking the three legs together, substantially as and for the purposes specified.

6. In a tripod, the combination of a head, a central leg pivotally held thereon, plates loosely connected to the head and adapted for movement in parallel planes, other legs pivoted on said plates, and a holding device on the head to limit the movement of the plates, said holding device being independent of the screw which connects the tripod-head to the camera, but having a portion arranged to engage the plates to hold them to the head, substantially as set forth.

7. In a tripod, the combination of a head, a central leg pivotally held thereon, plates loosely connected to the head and adapted for movement in parallel planes, legs pivoted on said plates, a holding device on the head to limit the movement of the plates and a device carried by the head and having engagement with each plate and arranged to lock the plates against pivotal movement, substantially as set forth.

8. A tripod having folding legs adapted, when folded, for movement relative to each other, means for causing such movement of the tripod-legs, and devices actuated by such relative movement, and arranged to lock the legs in folded position, substantially as set forth.

9. In a tripod, the combination of a head, legs pivotally connected thereto, and adapted to be folded side by side, and when so folded, adapted for movement relative to each other, means for causing such movement, and devices, actuated by the movement of the legs relative to each other, and arranged to lock the legs in folded position, substantially as and for the purposes specified.

10. In a tripod, the combination of a head, a central leg pivotally held thereon, plates loosely connected to the head and adapted for movement in planes parallel with the pivotal axis of the central leg, other legs pivoted on said plates and adapted, by the movement of the plates, to be folded alongside the central leg and when so folded, adapted for movement relative to said central leg, and means for causing such movement, and means, actuated by the movement of the legs relative to each other and arranged to lock the legs in folded position, substantially as set forth.

11. In a tripod, the combination of a head, a central leg pivotally held thereon, plates loosely held on the head and adapted for movement in planes parallel with the pivotal axis of the central leg and having pivoted legs, the pivotal axes of which are out of alinement with the pivotal axis of the central leg when the plates are moved to bring the legs in position to be folded alongside each other and are adapted when the legs are so folded to be moved relatively to the central leg, and means actuated by the movement of the legs relative to each other for locking the legs in folded position, substantially as set forth.

12. In a tripod, the combination of a head, legs pivotally connected to the head and adapted by such construction to be located alongside of each other, means comprising devices carried by the legs and arranged for reciprocal engagement for interlocking the legs, pivot connection for enabling the head to be folded on the legs, said locking means adapted to be actuated by the last-named pivotal movement of the head, substantially as and for the purposes specified.

13. In a tripod, the combination of a head, legs pivotally connected to the head and adapted to be laid alongside each other, the pivotal axes of the legs, when laid alongside each other, being out of alinement and the head, when the legs are so laid, being adapted to be folded over on the legs to impart movement to said legs relative to each other, and interlocking devices carried by the legs and caused by the movement of the legs relative to each other to lock the legs together, substantially as set forth.

14. In a tripod, the combination of a head, legs pivotally connected to the head and adapted to be laid alongside each other, the pivotal axes of the legs, when laid alongside each other, being out of alinement, and the head, when the legs are so laid being adapted to be folded over on the legs to impart movement to said legs relative to each other, and interlocking devices, each consisting of a pin carried by one leg and adapted for engagement, when the legs are moved relative to each other, with an opening in another leg, to lock the legs together, substantially as and for the purposes specified.

15. In a tripod, the combination of legs, and three plates, each of which is adapted to hold the upper end of its respective leg, two of which plates are pivotally connected to the third, and each of which has a perforation adapted when the plate is moved to aline with the perforation of the opposite plate, and a screw or the like passed through the perforations of the plates, for engagement with the load to be supported by the tripod, substantially as and for the purposes specified.

16. In a tripod having legs, adjustable lengthwise, the combination of the legs, and devices thereon adapted when the legs are shortened to interengage, and means adapted to cause such devices to engage each other for locking the legs together, substantially as and for the purposes specified.

17. In a tripod having legs, adjustable lengthwise, the combination of these legs and devices thereon at a distance from the head for locking them together, when the head or sections are folded against the legs, substantially as and for the purposes specified.

18. In a tripod, having legs adjustable lengthwise, the combination of these legs, when edge to edge, and locking devices thereon at a distance from the head for enabling them to be locked together when the head or sections are folded against the legs, substantially as and for the purposes specified.

19. In a tripod, the combination of a head, having an opening to receive the tripod-screw, legs, two of the legs each having a hole located for alinement with the hole of the other plate, and with the opening in the head to receive the tripod-screw, when the legs are assembled for supporting the tripod-head, and a stop secured to the head and having extensions, under which an edge of the pivoted plates comes when approximated, the plates being kept from further approximation by the stop, substantially as and for the purposes specified.

20. In a tripod, the hinged connections between the head and the legs which are adapted as the head is folded down on the legs, to move the central leg a distance different relatively to the other legs, and catches between said legs adapted to fasten the legs together by reason of the alternation of position of the central leg relatively to the outer legs, substantially as and for the purposes specified.

21. In a tripod, the hinged connections between the head and the legs which are adapted as the head is folded down on the legs, to move the central leg a distance different relatively to the other legs, and catches between said legs adapted to fasten the legs together by reason of the alternation of position of the central leg relatively to the outer legs, and the spring $K$, $K^2$, $K^3$, located on one section of a leg and adapted when the sections of the legs are folded to frictionize an inner section and prevent the same from falling out of position, substantially as and for the purposes specified.

22. A tripod-head comprising a horizontally-arranged set of members pivoted together on vertical hinges, and means for locking them in position to form a rigid supporting-frame, substantially as and for the purposes specified.

23. In a tripod, the combination of a head, three plates having end portions pivotally connecting said plates to each other, end to end, the outer plates being adapted for rotary movement toward and from each other, and the central plate being held in fixed relation to the head, and the pivoted outer plates being adapted for rotary movement across the under side of the head, and under a stop, and legs pivoted on the respective plates, substantially as and for the purposes specified.

24. In a tripod, the combination of a head, a central leg pivotally held thereto, plates loosely connected to the head and adapted for movement in parallel planes, legs pivoted on said plates, stop mechanism on the head to limit the movement of the plates, and a device carried by the head and having engagement with each plate and arranged to lock the plates against pivotal movement, substantially as and for the purposes specified.

25. A tripod comprising an instrument-base, a series of leg-holders supported thereby, said leg-holders being adapted to move outwardly in substantially the same plane into alinement with each other and to be moved into an angular position relatively to each other to support said base, and locking mechanism for securing the leg-holders in said angular position to said instrument-base, substantially as described.

26. A tripod, comprising an instrument-base, legs, a series of leg-holders supported by said instrument-base, each leg-holder being composed of a substantially flat plate provided with downwardly-projecting ears, said leg-holders being adapted to move outwardly in substantially the same plane into alinement with each other and to be moved into an angular position with reference to each other to support said base, and means for fastening said leg-holders in said angular position to said base, substantially as described.

27. In a tripod, the combination of an instrument-base, a series of leg-holders, one of said leg-holders being secured to said base and the other leg-holders being hinged to said first-named leg-holder, each leg-holder being composed of a substantially flat plate provided with downwardly-projecting ears, said leg-holders being adapted to be moved each in a single plane into an angular position with respect to each other, to support said instrument-base, and means securing said leg-holders in said angular position, said means being also secured to said instrument-base, substantially as described.

28. In a tripod, the combination of an instrument-base, a series of leg-holders carried thereby, one of said leg-holders being secured to said base and the other leg-holders having hinge connections with said first-named leg-holder, each of said leg-holders being composed of a substantially flat plate provided with downwardly-projecting ears, said leg-holders adapted to be moved into an angular position with reference to each other, to support said base, and a screw passing through perforations in some of said leg-holders and in said instrument-base to secure said leg-holders in said angular position, substantially as and for the purposes specified.

29. In a tripod, the combination of an instrument-base, a series of leg-holders carried thereby, one of said leg-holders being secured to said base and the other leg-holders having pivoted connections with said first-named leg-holder and said base, each of said leg-holders being composed of a substantially flat plate provided with downwardly-projecting ears, said leg-holders adapted to be moved each in a single plane into an angular position with reference to each other, to support said base, and a screw passing through perforations in some of said leg-holders and in said instrument-base to secure said leg-holders in said angular position, substantially as described.

RICHARD P. PALMER.

Attest:
CHARLES R. PALMER,
SAMUEL A. WEST.